United States Patent

Kassai

[11] Patent Number: 5,615,927
[45] Date of Patent: Apr. 1, 1997

[54] SEAT FOR CHILD-CARE IMPLEMENT

[75] Inventor: Kenzou Kassai, Osaka, Japan

[73] Assignee: Aprica Kassai Kabushikikaisha, Osaka, Japan

[21] Appl. No.: 506,860

[22] Filed: Jul. 25, 1995

[30] Foreign Application Priority Data

Aug. 5, 1994 [JP] Japan .................................. 6-184381
Oct. 24, 1994 [JP] Japan .................................. 6-257767

[51] Int. Cl.$^6$ ........................................................ A47C 7/02
[52] U.S. Cl. .................. 297/452.27; 5/740; 297/452.36; 297/452.24
[58] Field of Search ........................ 5/464, 481; 297/464, 297/467, 468, 452.27, 452.24, 452.33, 452.36

[56] References Cited

U.S. PATENT DOCUMENTS

| | | | |
|---|---|---|---|
| 3,000,020 | 9/1961 | Lombard et al. | 297/452.27 X |
| 3,270,394 | 9/1966 | Marsh et al. | 297/452.27 X |
| 4,510,634 | 4/1985 | Diedrich et al. | 297/464 X |
| 4,679,852 | 7/1987 | Anthony et al. | 297/464 |
| 4,682,818 | 7/1987 | Morell | 297/452.27 |
| 4,707,024 | 11/1987 | Schrader | 297/464 X |
| 4,741,544 | 5/1988 | Kassai | 280/113 |
| 4,951,334 | 8/1990 | Maier | 297/452.27 X |
| 5,115,523 | 5/1992 | Cone | 287/464 X |
| 5,294,181 | 3/1994 | Rose et al. | |
| 5,366,271 | 11/1994 | Johnston et al. | 297/250.1 |

FOREIGN PATENT DOCUMENTS

| | | |
|---|---|---|
| 2171848 | 9/1973 | France . |
| 2615714 | 12/1988 | France . |
| 858246 | 1/1961 | United Kingdom . |
| 2161375 | 1/1986 | United Kingdom . |

Primary Examiner—Peter M. Cuomo
Assistant Examiner—Stephen Vu
Attorney, Agent, or Firm—W. G. Fasse; W. F. Fasse

[57] ABSTRACT

In order to enable a seat for a child-care implement such as a baby carriage to supply a soft feeling while keeping a baby in a correct position, a principal part providing a backrest portion and a seat portion for supporting the upper body and the lower body of the baby respectively, is formed by a rigid base and a cushion member which is arranged on the front or facing side thereof. The cushion member is made of first, second and third cushion materials, which have elastic coefficients that increase in a direction away from a facing surface. A peripheral wall part forming walls extending uprightly around the principal part comprises an elastic core material for retaining its shape, and a cushion material covering the core material on inner and outer side surfaces and a top surface of the peripheral wall part. The cushion material has a smaller elastic coefficient than the core material.

9 Claims, 3 Drawing Sheets

SEAT FOR CHILD-CARE IMPLEMENT

FIELD OF THE INVENTION

The present invention relates to a seat which is provided on a child-care implement such as a baby carriage, a chair for children or a child safety seat for an automobile, and more particularly, it relates to improvement of a cushion structure which is applied to such a seat.

BACKGROUND INFORMATION

A seat for a child-care implement generally comprises a backrest portion and a seat portion for supporting the upper body and the lower body of a baby respectively. Some seats have a peripheral wall part forming walls extending uprightly around a principal part providing the aforementioned backrest and seat portions. The peripheral wall part may be formed by walls or a wall uprighted from both sides or an upper edge of the backrest portion, for example.

Important features of such a seat for a child-care implement are sufficient safety and comfortableness for the baby. In relation to the comfortableness, the baby feels most at ease in its mother's arms, for example, and hence it is preferable that the seat for a child-care implement can also provide or at least approximate the feeling of the mother's arms. A cushion member which is provided on the seat must relate to each of the above mentioned features.

The cushion member is preferably soft, in order to supply a comfortable feeling to the baby. However, if the cushion member is too soft in the portions such as the backrest and seat portions for supporting the baby's weight, the baby sinks into the seat so deeply that its spinal cord may be badly influenced. On the other hand, it is preferable that a portion such as the aforementioned peripheral wall part not directly supporting the baby's weight can hold the baby as softly as possible.

SUMMARY OF THE INVENTION

Accordingly, it is an object of the present invention is to provide a seat for a child-care implement which can provide excellent comfortableness while guaranteeing a high safety for a baby.

A seat for a child-care implement according to a first aspect of the present invention comprises a principal part providing a backrest portion and a seat portion for supporting the upper body and the lower body of a baby respectively, and a peripheral wall part forming walls extending uprightly and around the principal part. The principal part forming the backrest and seat portions comprises a rigid base for retaining the shapes of the backrest and seat portions, and a cushion member which is arranged on the front side of the base. On the other hand, the peripheral wall part comprises an elastic core material for retaining its shape, and a cushion material, having a smaller elastic coefficient than the core material, covering the core material on inner and outer side surfaces and a top surface of the peripheral wall part.

According to a second aspect of the present invention, at least a surface layer of the peripheral wall part is made of a cushion material, whether or not the peripheral wall part includes a core material.

In the principal part for supporting the baby's weight, the cushion member is lined with the rigid base, whereby the baby can be kept in a preferable position for its growth with no reduction of a comfortable feeling for the baby.

On the other hand, the peripheral part not supporting the baby's weight can hold the baby very softly due to the presence of the cushion material. Providing the peripheral wall part with an elastic core material as set forth in the first aspect of the present invention, does not inhibit the aforementioned function of extremely softly holding the baby since the core material is elastic.

According to the present invention, the inner structures of the principal part and the peripheral wall part differ from each other as hereinabove described, whereby it is possible to obtain a seat for a child-care implement that guarantees the child's safety while also providing a comfortable feeling to the baby.

If an elastic core material is employed in the peripheral wall part, the cushion material is arranged to cover the core material on the inner and outer side surfaces and the top surface of the peripheral wall part, whereby the covering cushion material has a smaller elastic coefficient than the core material according to the first aspect of the present invention. In an embodiment of the second aspect of the present invention at least a surface layer of the peripheral wall part is made of a cushion material. According to such a structure, the user will have a very soft feeling when contacting the peripheral wall part. Nevertheless, the body supporting parts provide the required structural support for keeping the baby in a correct position. Thus, the present seat structure satisfies the consumer's expectations.

According to the present invention, the cushion member which is arranged in the principal part preferably includes a first cushion material, a second cushion material, which is arranged on the back side of the first cushion material, having a larger elastic coefficient than the first cushion material, and a third cushion material, which is arranged on the back side of the second cushion material, said third cushion material having a larger elastic coefficient than the second cushion material. According to such a structure, substantially the first cushion material alone is deformed in an ordinary state to supply a comfortable feeling to the baby. When a shock is applied to the seat, on the other hand, the second cushion material as well as the third cushion material are deformed to effectively absorb the shock. Thus, the seat can provide an excellent shock absorbing function, while maintaining a comfortable feeling for the baby.

When the aforementioned third cushion material having a relatively large elastic coefficient is made to integrally extend toward the peripheral wall part, the core material forming the peripheral wall part in the first aspect or embodiment of the present invention can be provided by this third cushion material. Thus, the upright state of the peripheral wall part can be maintained by this core material, whereby no separate member is required for retaining the peripheral part in the upright state.

When the first cushion material is made to integrally extend toward the peripheral wall part, on the other hand, the cushion material forming at least the surface layer of the peripheral wall part in the second aspect or embodiment of the present invention can be provided by this first cushion material. When the first cushion material and the cushion material which is arranged in the peripheral part are integrally molded of a foaming material, for example, the shape of the peripheral wall part can be more easily retained by such a cushion material.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
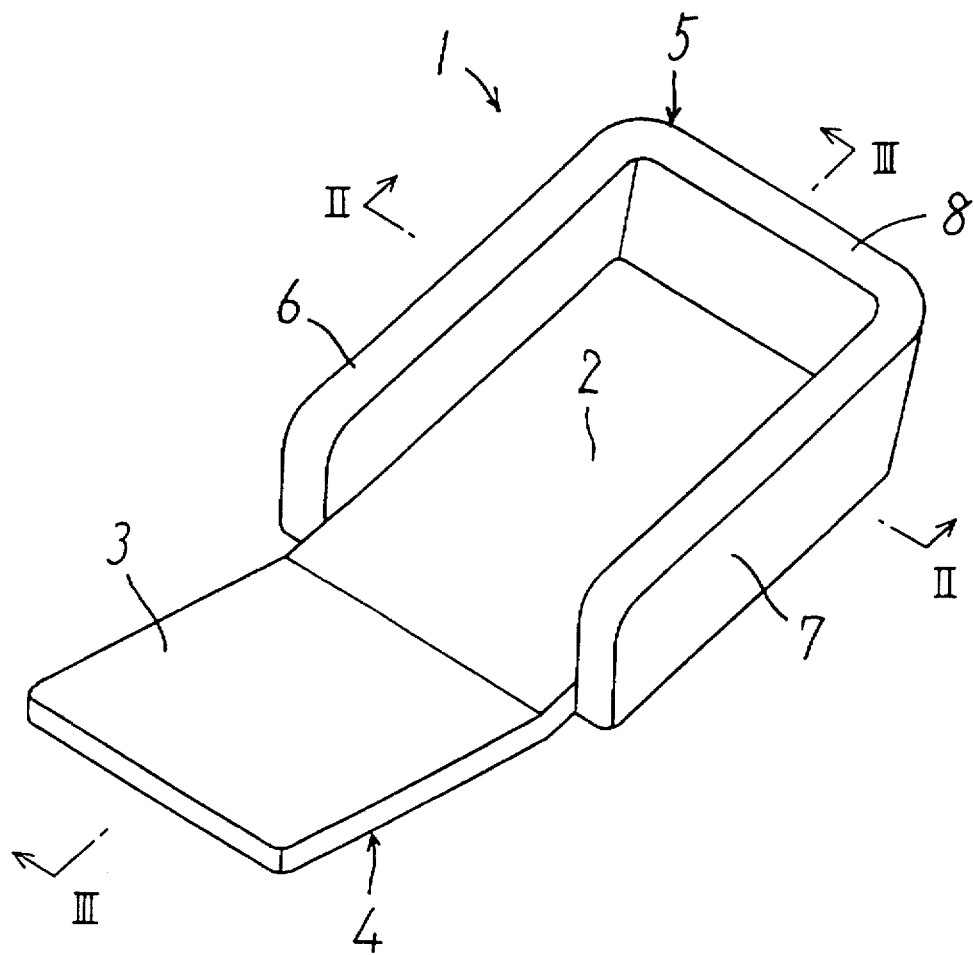
FIG. 1 is a perspective view showing the appearance of a seat 1 for a child-care implement according to an embodiment of the present invention.

FIG. 1 is a perspective view of a seat 1 according to a first embodiment of the present invention suitable for use in a child-care implement such as a baby carriage, for example.

The seat 1 comprises a principal part 4 having a backrest portion 2 and a seat portion 3 for supporting the upper body and the lower body of a baby. A peripheral wall part 5 forms walls which extend uprightly around the backrest portion 2 of the principal part 4. According to this embodiment, the peripheral wall part 5 comprises a pair of upright side walls 6 and 7 extended from both edges of the backrest portion 2, and an upright top wall 8 which extends uprightly from an upper edge of the backrest portion 2.

Figure 2:
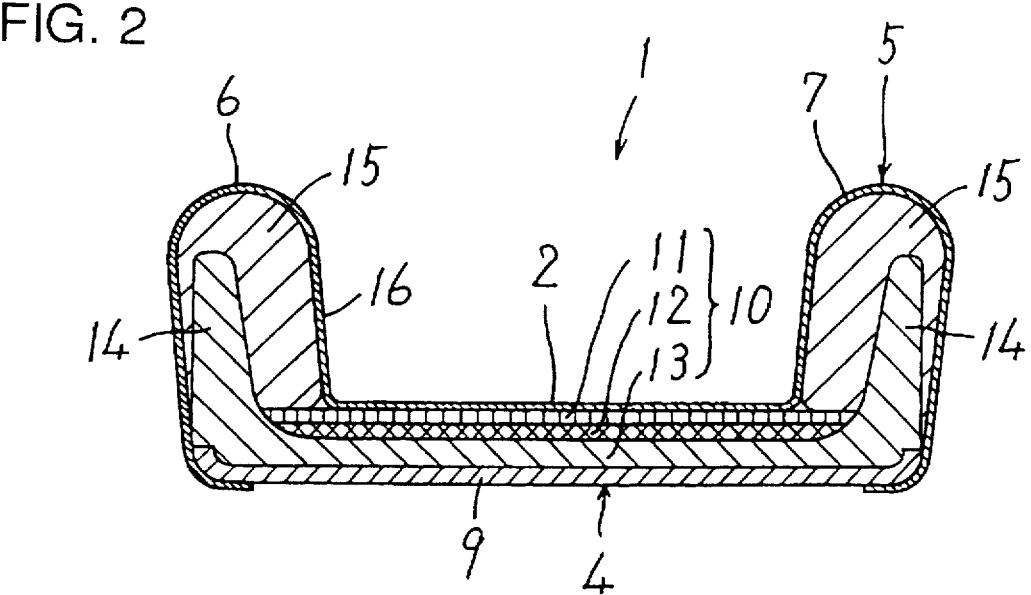
FIG. 2 is a sectional view taken along the line II—II in FIG. 1.

As shown in FIG. 2, the principal part 4 comprises a rigid base 9 for retaining the shapes of the backrest portion 2 and of the seat portion 3, and a cushion member 10 which is arranged on the front side or upwardly facing side of the base 9. The base 9 is made of hard plastic, for example. On the other hand, the cushion member 10 is formed by a first cushion material 11, a second cushion material 12, which is arranged on the back side of the first cushion material 11, having a larger elastic coefficient than the first cushion material 11, and a third cushion material 13, which is arranged on the back side of the second cushion material 12, having a larger elastic coefficient than the second cushion material 12. More specifically, the first cushion material 11 is made of urethane foam or cotton, for example. The second cushion material 12 is made of urethane foam having a higher density than that employed for the first cushion material 11, or urethane chips, for example. The third cushion material 13 is made of polyethylene expandable beads, styrene foam or urethane chips, for example.

Figure 3:
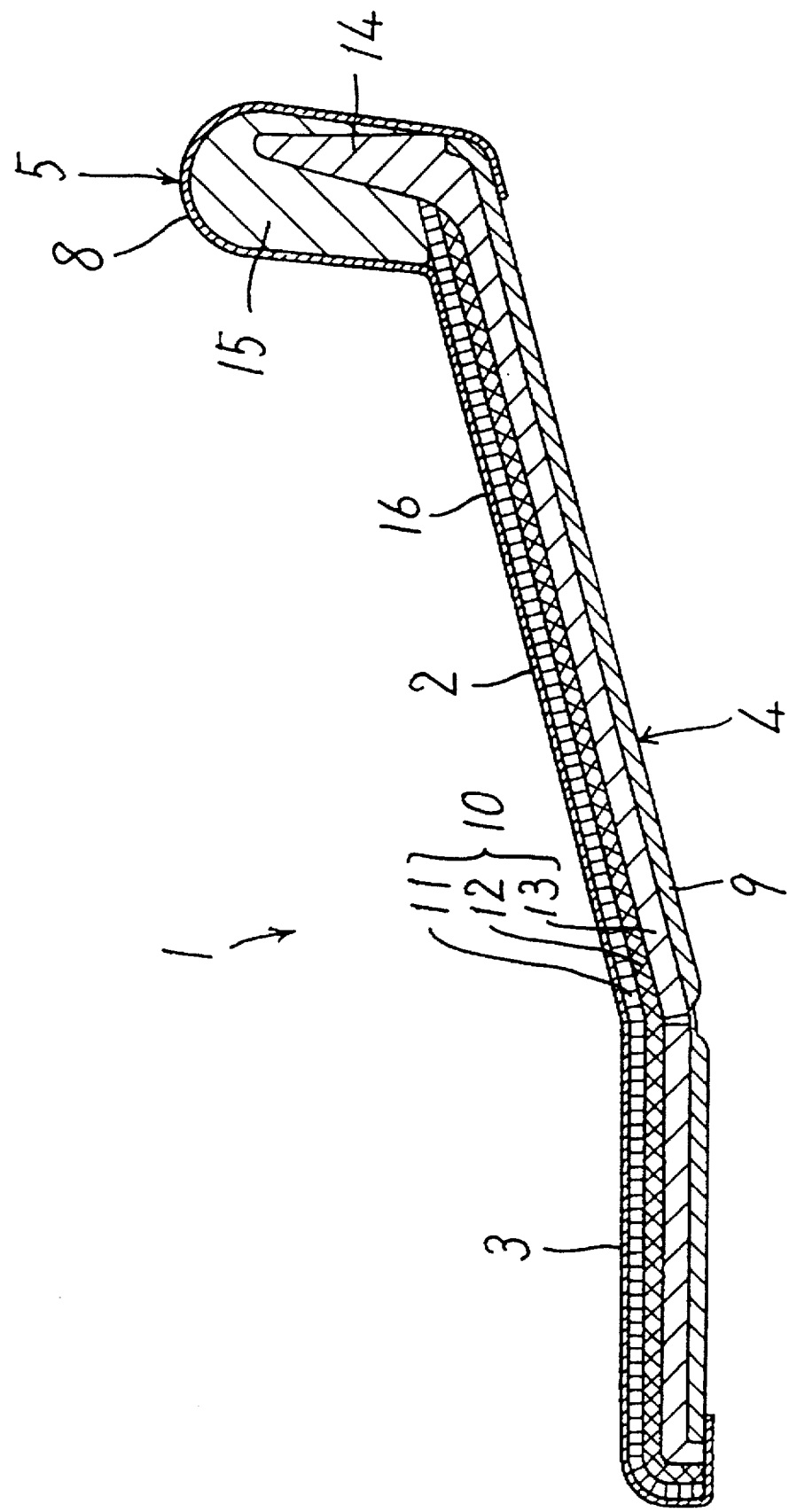
FIG. 3 is a sectional view taken along the line III—III in FIG. 1.

The peripheral wall part 5 comprises an elastic core material 14 for retaining its shape, and a cushion material 15 covering the core material 14 on inner and outer side surfaces and a top surface of the peripheral wall part 5. The cushion material 15 is made of a material having a smaller elastic coefficient than the core material 14. More specifically, the core material 14 is made of styrene foam or polyethylene expandable beads, while the cushion material 15 is made of urethane foam or cotton. The cushion material 15 between the core 14 and an inwardly facing cover 16 is preferably thicker on the inner side than on the outer side, as shown in FIGS. 2 and 3.

This seat 1 is entirely covered with the cover or facing 16.

According to this embodiment, the third cushion material 13 extends integrally toward the peripheral wall part 5, thereby also forming the core material 14. Thus, it is possible to retain the peripheral wall part 5 in the upright state by the core material 14 itself. If such an advantage is not desired, however, the core material 14 may alternatively be formed independently of the third cushion material 13. In this case, an additional member is provided for holding the core material 14, in order to retain the peripheral wall part 5 in the upright state. This additional member, which may be formed by a hard member such as a tubular member, for example, is preferably enclosed with the core material 14, not to deteriorate the feeling at the peripheral wall part 5.

Figure 4:
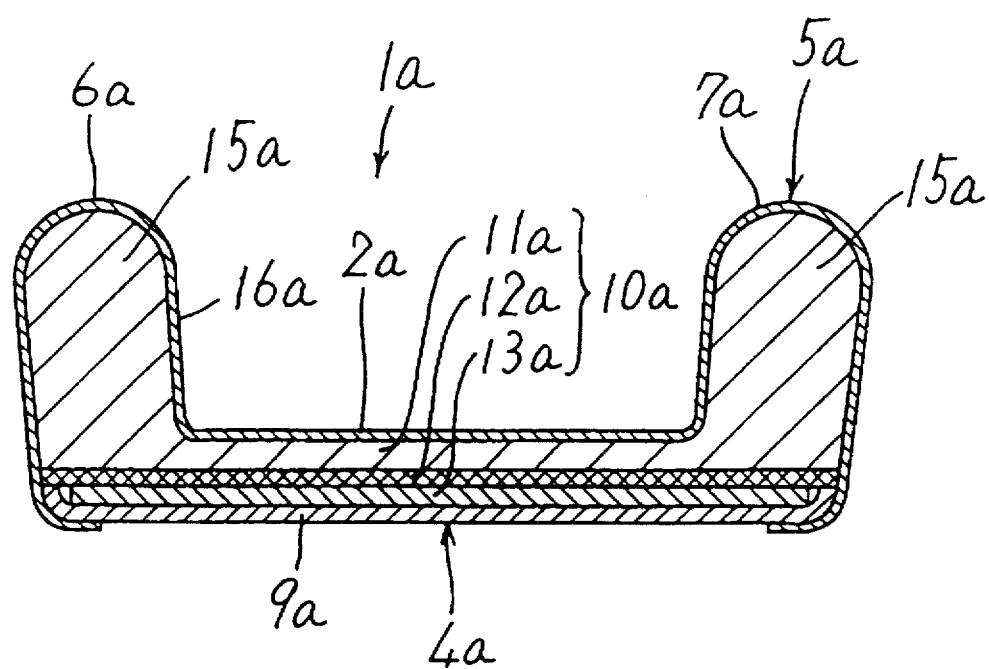
FIG. 4 is a sectional view corresponding to FIG. 2, showing a seat 1a for a child-care implement according to another embodiment of the present invention.

FIG. 4 is a sectional view corresponding to FIG. 2, showing a seat 1a for a child-care implement according to another embodiment of the present invention. Similarly to the seat 1 shown in FIG. 1, the seat 1a comprises a principal part 4a providing a backrest portion 2a, a seat portion (not shown), and a peripheral wall part 5a forming walls which extend in an upright position around the principal part 4a. This peripheral wall part 5a also comprises a pair of side walls 6a and 7a which extends uprightly from both edges of the backrest portion 2a, and a top wall (not shown) which extends uprightly from an upper edge of the backrest portion 2a.

The principal part 4a comprises a rigid base 9a for retaining the shapes of the backrest portion 2a and the seat portion, and a cushion member 10a which is arranged on the front side of the base 9a. The cushion member 10a is made of a first cushion material 11a, a second cushion material 12a, arranged on the back side of the first cushion material 11a, and a third cushion material 13a arranged on the back of the second cushion material 12a. The second cushion material 12a has a larger elastic coefficient than the first cushion material 11a. The third cushion material 13a, has a larger elastic coefficient than the second cushion material 12a, similarly to the first mentioned embodiment. The base 9a and the first to third cushion materials 11a, 12a and 13a can be made of materials similar to those for the base 9 and the first to third cushion materials 11 to 13 in the first mentioned embodiment respectively.

At least a surface layer (the whole in this second embodiment) of the peripheral wall part 5a is made of cushion material 15a. As shown in FIG. 4, this cushion material 15a is preferably integrally formed with the first cushion material 11a. More preferably, this cushion material 15a and the first cushion material 11a are integrally molded of urethane foam, for example. When the cushion material 15a is thus made of a material which is integrally molded with the first cushion material 11a, the cushion material 15a can be adapted to retain the shape of the peripheral wall part 5a.

The seat 1a is also entirely covered with a facing 16a.

The child-care implement to which the present invention is applied is not restricted to the aforementioned baby carriage, but the present invention is also applicable to a chair for children, a child safety seat for an automobile, a cradle or a swing, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A seat for a child-care implement, comprising a principal part including a backrest portion and a seat portion for supporting the upper body and the lower body of a baby, respectively; and a peripheral wall part forming walls having an upright shape at least around said backrest portion of said principal part, said principal part comprising a rigid base for retaining said backrest portion and said seat portion, and a cushion member arranged on a front side of said rigid base, said rigid base and said cushion member forming together a firm first cushioning structure, said peripheral wall part comprising an elastic core for retaining said upright shape, and a cushioning material covering said elastic core, said cushioning material having a smaller elastic coefficient than said elastic core, said cushioning material covering said elastic core on inner and outer side surfaces and on a top surface of said peripheral wall part to form together with said elastic core an elastic second cushioning structure that is softer than said first cushioning structure.

2. The seat for a child-care implement in accordance with claim 1, wherein said cushion member arranged on said front side of said rigid base includes a first cushion material (11), a second cushion material (12) arranged on the back side of said first cushion material (11), said second cushion material (12) having a larger elastic coefficient than said first cushion material (11), and a third cushion material (13) arranged on a back side of said second cushion material (12), said third cushion material (13) having a larger elastic coefficient than said second cushion material (12).

3. The seat for a child-care implement in accordance with claim 2, wherein said third cushion material (13) integrally extends into said peripheral wall part thereby forming said elastic core (14) of said second cushioning structure (15).

4. A seat for a child-care implement, comprising:

a principal part including a backrest portion and a seat portion for supporting the upper body and the lower body of a baby respectively; and a peripheral wall part forming walls having an upright shape at least around said backrest portion of said principal part, said principal part comprising a rigid base for retaining said backrest portion and said seat portion, and a cushion member arranged on a front side of said base, wherein said cushion member of said principal part comprises a central section and lateral upright sections (15a) integral with said central section, said lateral upright sections (15a) forming said peripheral wall part as a cushioning structure that is softer than said principal part with its rigid base, and wherein said cushion member (10a) arranged on said front side of said base includes a first cushion material (11a), a second cushion material (12a) arranged on a back side of said first cushion material (11a), said second cushion material (12a) having a larger elastic coefficient than said first cushion material (11a), and a third cushion material (13a) arranged on a back side of said second cushion material (12a), said third cushion material (13a) having a larger elastic coefficient than said second cushion material (12a), said first cushion material forming said central section and said lateral upright sections (15a) as an integral structure, whereby due to said rigid base, said peripheral part is softer than said principal part.

5. The seat for a child-care implement in accordance with claim 4, wherein said third cushion material integrally extends into said peripheral wall part formed by said lateral upright sections (15a), said third cushion material forming a core in said lateral upright sections (15a) of said peripheral wall part.

6. The seat for a child-care implement in accordance with claim 4, wherein said second cushion material (12a), said third cushion material (13a) and said rigid base (9a) extend entirely under said principal part and under said lateral upright sections.

7. The seat for a child-care implement in accordance with claim 6, further comprising a cover (16a) enclosing said principal part, said peripheral wall parts (15a), and said rigid base at least along edges of said rigid base.

8. The seat for a child-care implement in accordance with claim 3, wherein said first cushion material and said second cushion material reach laterally into a gap between said third cushion material and said cushion material of said peripheral wall part.

9. The seat for a child-care implement in accordance with claim 8, further comprising a cover (16) enclosing said principal part, said peripheral wall parts, and said rigid base at least along edges of said rigid base.

* * * * *

UNITED STATES PATENT AND TRADEMARK OFFICE
CERTIFICATE OF CORRECTION

PATENT NO. : 5,615,927
DATED : Apr. 1, 1997
INVENTOR(S) : Kassai

It is certified that error appears in the above-indentified patent and that said Letters Patent is hereby corrected as shown below:

On the Title Page:
In [54] after "FOR" insert --A--;

In [56] References Cited
U.S. PATENT DOCUMENTS, please insert the following:

--5,327,596    7/1994    Wallace et al.........
  5,459,892   10/1995    Buonocore...........
  5,481,771    1/1996    Burk, IV................--.

Col. 1, line 1, after "FOR" insert --A--;

Col. 3, line 3, delete "1";
         line 26, replace "extended" by --extending--.
Col. 4, line 36, after "of" (second occurrence) insert --a--.

Signed and Sealed this

Fifth Day of August, 1997

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO.  : 5,615,927
DATED       : April 1, 1997
INVENTOR(S) : Kenzou Kassai

It is certified that error appears in the above-indentified patent and that said Letters Patent is hereby corrected as shown below:

Column 1, line 40, delete "is" (second occurrence).

Signed and Sealed this

Fourteenth Day of October, 1997

Attest:

BRUCE LEHMAN

Attesting Officer      Commissioner of Patents and Trademarks